United States Patent [19]

Itoh et al.

[11] Patent Number: 4,653,353
[45] Date of Patent: Mar. 31, 1987

[54] SPOOL-TYPE CONTROL VALVE ASSEMBLY WITH REDUCED SPOOL STROKE FOR HYDRAULIC BELT-AND-PULLEY TYPE CONTINUOUSLY VARIABLE TRANSMISSION

[75] Inventors: Hiroshi Itoh, Toyota; Teruo Akashi, Nagoya; Mitsuru Takada, Toyota, all of Japan

[73] Assignee: Toyota Jidosha Kabushiki Kaisha, Toyota, Japan

[21] Appl. No.: 684,734

[22] Filed: Dec. 21, 1984

[30] Foreign Application Priority Data

Dec. 24, 1983 [JP] Japan ................. 58-251676
Dec. 24, 1983 [JP] Japan ................. 58-251677
Jan. 31, 1984 [JP] Japan ................. 59-16856

[51] Int. Cl.⁴ .......................... B60K 41/16
[52] U.S. Cl. .................................. 74/868
[58] Field of Search .............. 74/856, 861, 865, 867, 74/868; 474/18, 28

[56] References Cited

U.S. PATENT DOCUMENTS

| | | | |
|---|---|---|---|
| 3,893,344 | 7/1975 | Dantlgraber et al. | 74/867 X |
| 4,400,164 | 8/1983 | Cadee | 74/867 X |
| 4,458,318 | 7/1984 | Smit et al. | 474/18 X |
| 4,458,560 | 7/1984 | Frank et al. | 74/865 X |
| 4,462,275 | 7/1984 | Mohl et al. | 474/18 X |
| 4,470,117 | 9/1984 | Miki et al. | 474/18 X |
| 4,475,416 | 10/1984 | Underwood | 74/868 |
| 4,476,746 | 10/1984 | Miki et al. | 74/867 |

Primary Examiner—Leslie Braun
Assistant Examiner—Dwight G. Diehl
Attorney, Agent, or Firm—Oblon, Fisher, Spivak, McClelland & Maier

[57] ABSTRACT

A hydraulic control system for a continuously variable transmission having a cylinder for changing the effective diameter of a pulley to control a speed ratio of the transmission. The control system comprises a spool valve assembly communicating with the cylinder to control the supply and discharge flows of a fluid to and from the cylinder. The valve assembly comprises a shift-speed control valve unit for controlling a rate of variation in the speed ratio of the transmission. The shift-speed control valve unit has only two discharge ports associated with the fluid discharge from the cylinder. The shift-speed control valve unit may take the form of a spool valve having a spool axially movable to open and close the ports to permit and restrict the fluid flows through supply and discharge conduits communicating with the ports and the cylinder. The spool may only partially open the corresponding port to permit the fluid flow therethrough for supplying or discharging the fluid. The valve assembly may comprise a shift-direction switching valve unit for changing the direction in which the speed ratio is varied. The switching valve unit has only two discharge ports associated with the fluid discharge from the cylinder.

11 Claims, 11 Drawing Figures

SPOOL-TYPE CONTROL VALVE ASSEMBLY WITH REDUCED SPOOL STROKE FOR HYDRAULIC BELT-AND-PULLEY TYPE CONTINUOUSLY VARIABLE TRANSMISSION

BACKGROUND OF THE INVENTION

The present invention relates generally to an apparatus for controlling a hydraulically-operated continuously variable transmission of belt-and-pulley type, particularly to a hydraulic control system or device including directional and flow control spool-valve units for controlling the shifting operation of the transmission. More particularly, the invention is concerned with improvements in operating response of the spool valves during their duty cycling flow control operations, and concerned with technologies for widening the range of control of the fluid flow in relation to a variation in the duty cycle.

A continuously variable transmission of belt-and-pulley type is known, which comprises an input shaft, an output shaft disposed parallel to the input shaft, a first variable-diameter pulley including a pair of opposed rotary members mounted on the input shaft, a second variable-diameter pulley including another pair of opposed rotary members mounted on the output shaft, and a transmission belt connecting the first and second variable-diameter pulleys. The speed ratio of the transmission is varied by changing the effective diameters of the variable-diameter pulleys. The effective diamter is changed by controlling the supply and discharge flows of a pressurized fluid into and from a hydraulic cylinder which is adapted to change the diameter of the pulley. An example of a hydraulic control system for a continuously variable transmission of belt-and-pulley type is disclosed in Japanese Patent Application 58-31298 laid open Sept. 10, 1984 under publication 59-159456 filed in the name of the assignee of the present application. In the case where such a transmission is used for an automotive vehicle, the speed of the engine can be optimally controlled by continuously changing the speed ratio of the transmission in response to the running conditions of the vehicle, so that the maximum fuel economy is obtained.

In such a hydraulic control system or device for the above-indicated transmission, there is employed a shift-speed control valve unit comprising (a) a valve body having a cylinder bore, (b) a spool which has a shaft portion, and plural spool lands larger in diameter than the shaft portion and spaced from each other along the axis of the shaft portion, and which is slidably received in the cylinder bore in the valve body, and (c) a spool actuator for operating the spool to selectively position the spool between its two axial positions. Upon axial movements of the spool, its spool lands selectively open and close the ports which communicate with conduits to supply and discharge the fluid to and from the previously indicated hydraulic cylinder to change the effective diameter of the variable-diameter pulley of the transmission. With the opening and closing of the ports, the fluid supply and discharge flows to and from the hydraulic cylinder are controlled, i.e., either permitted or restricted, and the rate of variation in the speed ratio of the transmission (i.e., shifting speed of the transmission) is controlled. In this valve unit, a pair of ports are provided in the discharge conduit, one communicating with the upstream side of the conduit and the other communicating with the downstream side. In addition, another port is provided in communication with a restrictor passage for restricting the fluid flow from the hydraulic cylinder. Thus, a total of three ports are provided in association with the discharge of the fluid from the cylinder. Generally, the above indicator pair of ports are brought into communication with each other to permit the discharge flow, and the restrictor port is put into communication with one of said pair of ports to restrict the fluid flow. In such an arrangement having a total of three ports, the valve spool should have a relatively large axial dimension (length) and is therefore constructed with a relatively large mass. Therefore, the operating response of the valve unit is not sufficiently high. This means a comparatively narrow range of duty-cycling control of the fluid flow in relation to a variation in the duty cycle of the valve unit. Thus, the known hydraulic control arrangement for a continuously variable transmission suffers considerable difficulty in assuring smooth and high-precision control of the rate of variation in the speed ratio of the transmission, i.e., shifting speed of the transmission.

The known hydraulic control device also includes a shift-direction switching valve unit for changing the direction of flow of the pressurized fluid to supply or discharge the fluid to or from the hydraulic cylinder for changing the direction of shifting of the transmission. This valve unit is similar in construction to the above-described shift-speed control valve unit, and has the similar inconvenience in terms of the operating response.

SUMMARY OF THE INVENTION

It is therefore an object of the present invention to provide a hydraulic control system for controlling a continuously variable transmission of belt-and-pulley type, which includes a spool-type directional and flow control valve assembly having an improved operating response.

According to the present invention, there is provided a hydraulic control system for controlling a speed ratio of a hydraulically-operated continuously variable transmission of belt-and-pulley type having a variable-diameter pulley and a hydraulic cylinder for changing an effective diameter of the variable diameter-pulley of the transmission, the hydraulic control system comprising a speed-ratio control valve assembly for controlling the supply and discharge of a pressurized fluid to and from the hydraulic cylinder to thereby change the speed ratio of the transmission, said speed-ratio control valve assembly including a shift-speed control valve unit of spool-valve type disposed in fluid supply and discharge conduits communicating with the hydraulic cylinder, the shift-speed control valve unit being selectively placed in a first state in which the fluid supply and discharage flows to and from the hydraulic cylinder through the supply and discharge conduits are permitted, or in a second state in which said fluid supply and discharge flows are restricted, to control a rate of variation in the speed ratio of the transmission, wherein the improvement comprises said shift-speed control unit having only two discharge ports as ports associated with the fluid discharge from the hydraulic cylinder, the two discharge ports consisting of an upstream discharge port communicating with an the hydraulic cylinder, and a downstream discharge port communicating with a drain conduit, the upstream and downstream discharge ports being held in communication with each other when the shift-speed control valve unit is placed in said first state, but not in communication with each other when the valve unit is placed in said second state.

In the hydraulic control system constructed as described above, the shift-speed control valve unit has only two discharge ports, i.e., an upstream discharge port and a downstream discharge port, for discharging the fluid from the hydraulic cylinder. In other words, the valve unit has no restrictor passage for restricting the fluid flow from the cylinder, and therefore no restrictor port communicating with such a restrictor passage. Thus, there is no need of providing the spool of the valve unit with an additional spool land for opening and closing the restrictor port. The elimination of this additional spool land reduces the overall length and consequently the mass of the spool, which results in improvement in operating response of the shift-speed control valve unit. The improved response permits an increased range of control of the fluid flow in relation to a variation in the duty cycle of the valve during a duty-cycling operation to control the rate of variation in the speed ratio of the transmission. As a result, the instant hydraulic control system makes it possible to achieve smooth and accurate regulation of the speed ratio of the transmission.

In one form of the invention, the shift-speed control unit comprises a single spool axially movable between a first and a second position corresponding to said first and second states to permit and restrict the fluid supply and discharge flows, and further comprises a pilot solenoid valve to activate the spool by means of selective application of the fluid pressure to the spool.

In another form of the invention, the shift-speed control valve unit comprises a first spool axially movable between two positions for permitting and restricting the discharge flow of the fluid through the fluid discharge conduit, respectively, and a second spool axially movable between two positions for permitting and restricting the supply flow of the fluid through the fluid supply conduit, respectively, the shift-speed control valve unit further comprising a single pilot solenoid valve to activate the first and second spools by means of selective application of the fluid pressure to the spools.

According to another aspect of the invention, the shift-speed control valve unit comprises (a) a valve body having a cylinder bore and plural ports communicating with the fluid supply and discharge conduits and open to the cylinder bore, (b) a spool having a shaft portion, and a plurality of spool lands larger in diameter than the shaft portion and spaced from each other axially of the shaft portion, the spool being slidably received in the cylinder bore, and (c) a spool actuator to activate the spool by means of selective application of the fluid pressure to an end face of the spool, to thereby axially move the spool between a first position in which the supply and discharge flows of the fluid to and from the hydraulic cylinder through the supply and discharge conduits are permitted, and a second position in which said supply and discharge flows are restricted, the spool lands opening and closing the ports when the spool is moved between the first and second positions, whereby the shift-speed control valve unit is placed selectively in first and second states corresponding to the first and second positions, to control a rate of variation in the speed ratio of the transmission, wherein the improvement comprises:

the spool lands of the spool only partially opening the corresponding port to permit the flow of the fluid therethrough at least when the spool is placed in one of said first and second positions.

In the above arrangement, at least one of the first and second positions of the spool is determined so that the corresponding port is only partially open to the cylinder bore (partially closed), whereby the operating stroke of the spool is significantly reduced. Accordingly, the operating response of the shift-speed control valve unit is improved. This arrangement provides the same advantage as previously indicated, that is, increased controllable range of the fluid flow as a function of a variation in the controlled duty cycle, which assures smooth and accurate control of the rate of change in the speed ratio of the transmission.

According to a further aspect of the invention, there is provided a hydraulic control system for controlling a speed ratio of a hydraulically-operated continously variable transmission of belt-and-pulley type having a variable-diameter pulley and a hydraulic cylinder for changing an effective diameter of the pulley, the hydraulic control system comprising a speed-ratio control valve assembly for controlling the supply of a pressurized fluid from a hydraulic pressure source to the hydraulic cylinder, and the discharge of the fluid from the hydraulic cylinder, to thereby change the speed ratio of the transmission, the speed-ratio control valve assembly including a shift-direction switching valve unit comprising (a) a valve body having a cylinder bore and plural ports open to the cylinder bore, (b) a spool having a shaft portion, and a plurality of spool lands larger in diameter than the shaft portion and spaced from each other axially of the shaft portion, the spool being slidably received in the cylinder bore, and (c) a spool actuator to activate the spool by means of selective application of the fluid pressure to an end face of the spool, to thereby axially move the spool between a first position in which the supply flow of the fluid from the pressure source to the hydraulic cylinder is permitted, and a second position in which said supply flow of the fluid is inhibited while the discharge flow from the hydraulic cylinder is permitted, the spool lands opening and closing said ports when the spool is moved between said first and second positions, whereby the shift-speed control valve unit is placed selectively in first and second states corresponding to the first and second positions, to control a direction of flow of the fluid and thereby control a direction in which the speed ratio of the transmission is varied, wherein the improvement comprises the spool lands of the spool only partially opening the corresponding port to permit the flow of the fluid therethrough at least when the spool is placed in one of said first and second positions.

In the above arrangement wherein at least one of the first and second positions of the spool is determined so that the corresponding port is only partially open to the cylinder bore, the operating stroke of the spool is appreciably reduced, which provides an improvement in the operating response of the shift-direction switching valve unit.

BRIEF DESCRIPTION OF THE DRAWING

The above and other objects, features and advantages of the present invention will be better understood from reading the following description of the preferred embodiments taken in conjunction with the accompanying drawing in which.

DESCRIPTION OF THE PREFERRED EMBODIMENTS

Referring to the accompanying drawings, preferred embodiments of the invention will be described in detail.

Figure 1:
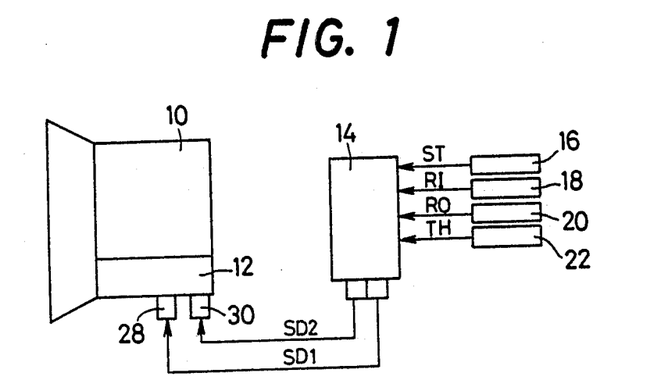
FIG. 1 is a schematic diagram showing a general arrangement of a continuously variable transmission of belt-and-pulley type equipped with one embodiment of a hydraulic control system of the present invention.

There is shown in FIG. 1 a hydraulically-operated continuously variable transmission 10 of belt-and-pulley type (hereinafter referred to as "transmission 10") which is operatively connected to an engine and drive wheels of an automotive vehicle to transmit an output of the engine to the drive wheels, at a controlled speed ratio (ratio of a rotating speed of an input shaft over that of an output shaft). The transmission 10 is equipped with a hydraulic control system of the invention which includes a hydraulic control device 12 for shifting or changing the speed ratio. Also shown in FIG. 1 is a speed-ratio controller 14 which is connected to a throttle sensor 16 disposed on a throttle valve (not shown), a first rotation sensor 18, a second rotation sensor 20, and a transaxle oil-temperature sensor 22, so that the speed-ratio controller 14 receives, from the respective sensors 16, 18, 20 and 22, a THROTTLE signal ST representing an opening angle of the throttle valve (i.e., representing a currently required output of the engine), a ROTATION signal RI representing a rotating speed of a first variable-diameter pulley 24 of the transmission 10 (representing an actual speed of the engine), a ROTATION signal RO representing a rotating speed of a second variable-diameter pulley 26 of the transmission 10, and a TEMPERATURE signal TH representing an oil temperature of a transaxle of the vehicle. Based on these signals, the controller 14 recognizes the currently required running conditions of the vehicle (engine) and determines a target value of a variable to be controlled, such as a target speed of the engine or a target speed ratio of the transmission 10, primarily based on the requirement for establishing the currently required running condition of the vehicle with minimum fuel consumption (for maximum fuel economy). The controller 14 feeds DRIVE signals SD1 and SD2 to pilot solenoid valves 28 and 30 provided within the hydraulic control device 12. The DRIVE signals SD1 and SD2 are adapted such that an actual value of the variable to be controlled, such as an actual speed of the engine or an actual speed ratio of the transmission 10, coincides with the determined target value.

Figure 2:
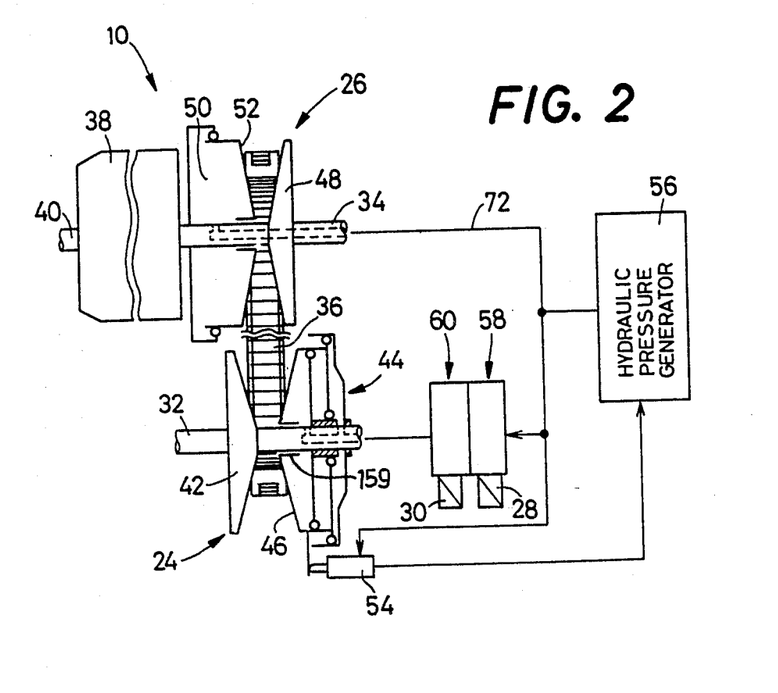
FIG. 2 is a illustrative view of essential parts of the arrangement of FIG. 1.

Specific examples of the transmission 10 and the hydraulic control device 12 are illustrated in FIG. 2. The transmission 10 comprises an input shaft 32, an output shaft 34, the previously indicated first variable-diameter pulley 24 mounted on the input shaft 32, the previously indicated second variable-diameter pulley 26 mounted on the output shaft 34, and a transmission belt 36 connecting the first and second viriable-diameter pulleys 24 and 26. A torque of the engine imparted to the input shaft 32 is transmitted to the output shaft 34 via the belt 36, and further to another output shaft 40 via a gear device 38 which includes a train of gears such as planetary gears for changing a direction of rotation. The output shaft 40 of the gear device 38 is operatively connected to drive wheels of the vehicle via a differential gear. The first variable-diameter pulley 24 includes a stationary rotor 42 fixed to the input shaft 32, and an axially movable rotor 46 which fits on the input shaft 32 axially slidably but not rotatably relative to the shaft 32. The movable rotor 46 is moved axially on the input shaft 32 by a hydraulic pressure applied to a first hydraulic cylinder 44. By changing the hydraulic pressure, the width of a Vee groove defined by the stationary and movable rotors 42 and 46 is changed, whereby the effective diameter of the first pulley 24 engaging the belt 36 is accordingly changed. Similarly, the second variable-diameter pulley 26 includes a stationary rotor 48 fixed to the output shaft 34, and an axially movable rotor 52 which fits on the output shaft 34 axially slidably but not rotatably relative to the shaft 34. The movable rotor 52 is moved axially on the output shaft 34 by a hydraulic pressure applied to a second hydraulic cylinder 50. By changing the hydraulic pressure, the width of a V groove defined by the stationary and movable rotors 48 and 52 is changed, whereby the effective diameter of the second pulley 26 engaging the belt 36 is accordingly changed. The first hydraulic cylinder 44 is of double-piston construction, and given a greater thrust than the second hydraulic cylinder 50 even when the same level of pressure is applied to these hydraulic cylinders 44, 50.

The hydraulic control device 12 comprises: (1) a hydraulic pressure generator 56 which generates a hydraulic line pressure which is determined by SPEED-RATIO PRESSURE signal produced from a sensing valve 54, and by an angle of opening of the throttle valve (not shown) which is disposed in an intake manifold of an engine, the SPEED-RATIO PRESSURE signal representing an actual speed ratio of the transmission 10 as described later; (2) a shift-direction switching valve unit 58 which is adapted to change a direction in which the movable rotor 46 is shifted relative to the stationary rotor 42, i.e., a direction of variable in the speed ratio of the transmission 10, such that the switching action of the valve unit 58 selectively permits the supply of the pressurized fluid of the line pressure to the first hydraulic cylinder 44 or the discharge of the fluid out of the hydraulic cylinder 44, for movement of the movable rotor 46 in the selected one of opposite directions along the axis of the input shaft 32; and (3) a shift-speed control valve unit 60 which is adapted to control a rate of flow of the pressurized fluid supplied to or discharged from the first hydraulic cylinder 44, and thereby control a rate of variation in the speed ratio of the transmission 10.

Figure 3:
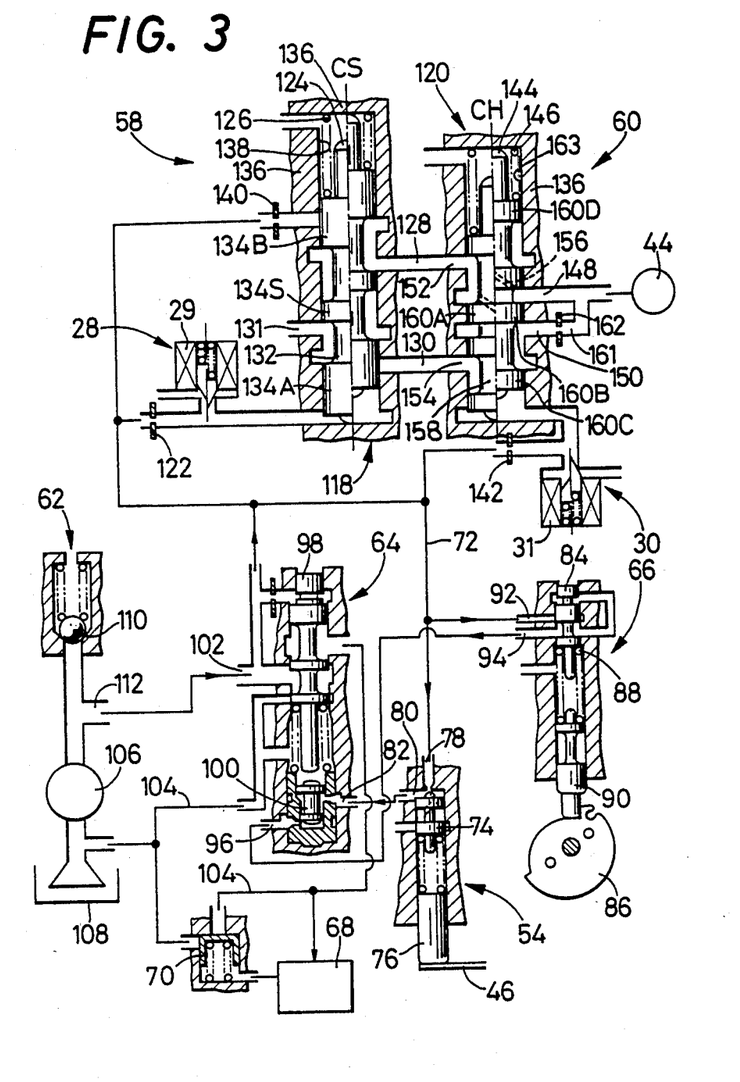
FIG. 3 is a fragmentary view in cross section of a hydraulic control device used in the arrangement of FIGS. 1 and 2.

Referring to FIG. 3, the hydraulic control device 12 comprising the above indicated hydraulic pressure generator 56 and valve units 58, 60 will be described in greater detail.

The hydraulic pressure generator 56 includes a pumping assembly 62, a regulator valve 64, a throttle sensing valve 66, a cooler 68, and a cooler-pressure valve 70, and is arranged to supply, through supply conduits 72, the shift-direction switching valve unit 58, shift-speed control valve unit 60, sensing valve 54, and other elements with a hydraulic line pressure which is varied depending upon the detected throttle opening angle and actual speed ratio of the transmission 10.

Figures 4, 5:
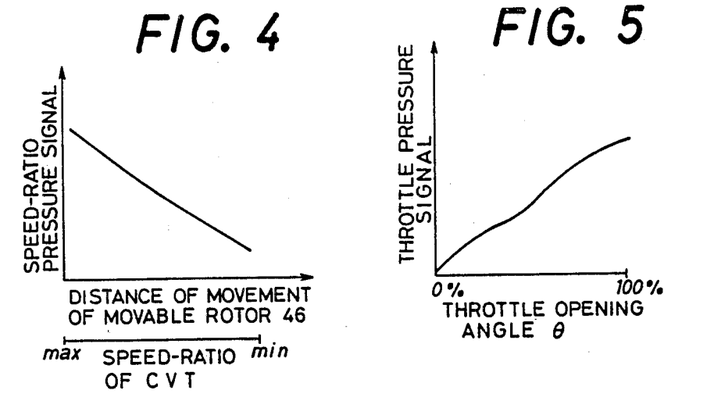
FIG. 4 is a graph showing a relation between a SPEED-RATIO PRESSURE signal from a sensing valve shown in FIG. 3, and a distance of movement of a movable rotor of the transmission.
FIG. 5 is a graph showing a relation between a THROTTLE PRESSURE signal from a throttle sensing valve shown in FIG. 3, and an angle of opening of a throttle valve.

The sensing valve 54 includes a spool 74, and a spring-loaded sensing piston 76 which is moved together with the movable rotor 46 of the first variable-diameter pulley 24, to bias the spool 74 via the spring with a force corresponding to the actual speed ratio of the transmission 10. Stated more specifically, an area of communication between an input port 78 and an output port 80 of the valve 54 is changed according to a distance of the movement of the spool 74 which is changed as a function of the actual speed ratio of the transmission 10. Therefore, the pressure output from the output port 80, which is applied to an input port 82 of the regulator valve 64, serves as the previously indicated SPEED-RATIO PRESSURE signal whose level is changed in relation to the movement of the spool 74 as illustrated in FIG. 4.

The throttle sensing valve 66 includes: a spool 84; a cam 86 rotated as a function of an opening angle of the throttle valve (not shown); a piston 90 engaging the cam 86 and moved as the cam 86 is rotated; and a spring 88 interposed between the spool 84 and the piston 90. In this arrangement, the spool 84 is moved while being biased by the spring 88 whose biasing force is changed as a function of the opening angle of the throttle valve (not shown) which represents a currently required output of the engine. An area of communication between an input port 92 of the valve 66 and the conduit 72 is adjusted according to the movement of the spool 84, whereby the pressure output from an output port 94 serves as a THROTTLE PRESSURE signal whose level is changed in relation to the opening angle of the throttle valve (not shown), as illustrated in FIG. 5. This pressure signal (pressure output from the output port 94) is applied to an input port 96 of the regulator valve 64.

Figure 6:
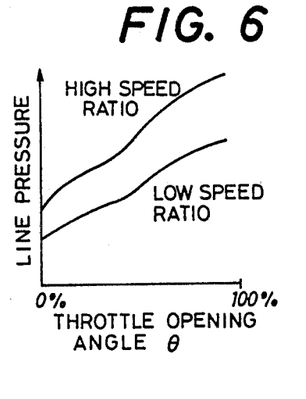
FIG. 6 is a graph showing a relation between a line pressure regulated by a regulator valve shown in FIG. 3, and the opening angle of the throttle valve.

The regulator valve 64 includes a spool 98, and a valve plunger 100 which is actuated by the previously discussed SPEED-RATIO PRESSURE signal and THROTTLE PRESSURE signal (pressure outputs from the output ports 80 and 94), to control the movement of the spool 98 and thereby adjust an area of communication between a line port 102 connected to the pumping assembly 62, and a return conduit 104 connected to the cooler-pressure control valve 70, whereby the line pressure of the conduits 72 communicating with the line port 102 is adjusted as illustrated in FIG. 6. Thus, the regulator valve 64 serves to regulate the line pressure used by the transmission 10, so that the pressure is held at a minimum level required to operate the transmission 10 without a slip of the belt 36. This line pressure regulation to the minimum required level is intended to minimize a power loss of the engine which is used to drive a pump 106 of the pumping assembly 62, and to thereby maximize the fuel economy of the vehicle.

The pump 106 pumps up the working fluid returned to a reservoir 108 from the cooler 68, sensing valve 54, throttle sensing valve 66, shift-direction switching valve 58, shift-speed control valve 60, etc. via drain conduits (not shown). The pressurized fluid from the pump 106 is supplied to the regulator valve 64 via a conduit 112 in which a relief valve 110 is incorporated.

The previously described shift-direction switching valve unit 58 and shift-speed control valve unit 60, which cooperate to constitute a speed-ratio control valve assembly in this embodiment, include the solenoid valve 28 and a spool valve 118, and the solenoid valve 30 and a spool valve 120, respectively. The solenoid valves 28 and 30 are fed with the line pressure through the conduits 72. The solenoid valve 28 is provided with a solenoid 29, and an orifice 122 disposed in a passage communicating with the conduit 72. The spool valve 118 includes a spool 124 having a pressure receiving end face, and a spring 126 biasing the spool 124 at its end opposite to the pressure receiving end face. When the solenoid valve 28 is in the closed position, i.e., when the solenoid 29 is OFF, the line pressure exerted through the orifice 122 as a pilot pressure is applied so as to act on the pressure receiving end face of the spool 124, whereby the spool 124 is moved against a biasing force of the spring 126 and placed in its "B" state (SUPPLY position). This state of the spool 124 (spool valve 118) is indicated in FIG. 3 on the right side of the centerline CS. When the solenoid valve 28 is in the open position with the solenoid 29 in the ON position, the pilot pressure (line pressure through the orifice 122) is released through the solenoid valve 28 in the open position, and through a conduit downstream of the orifice 122. Consequently, the spool 124 is moved with a biasing force of the spring 126 and placed in its "A" state (DISCHARGE position). This state of the spool 124 (spool valve 118) is indicated on the left side of the centerline CS. In other words, the spool 124 is moved between its two positions (between the first and second positions) (which will be described in detail) in response to the operation of the solenoid valve 28 which acts as a pilot valve for the spool valve 118.

When the spool 124 is placed in its "B" state (positioned on the side of the spring 126), the conduit 72 and a feed conduit 128 are held in communication with each other while the communication between a drain conduit 131 and a discharge conduit 130 is inhibited. Thus, in the "B" state, the supply of the line pressure to the first hydraulic cylinder 44 is permitted, and thus the pressure in the cylinder 44 is increased. When the spool 124 is placed in its "A" state on the side of the pressure receiving end face, the communication between the conduits 72 and 128 is inhibited while the drain and discharge conduits 131 and 130 are held in communication. Thus, in the "A" state, the supply of the line pressure to the first hydraulic cylinder is inhibited, and the pressure in the cylinder 44 is reduced.

The spool 124 consists of a shaft portion 132, and three spool lands 134A, 134B and 134S which are larger in diameter than the spool shaft portion and spaced from each other along the axis of the shaft portion 132. The thus constructed spool 124 is slidably received in a cylinder bore 138 formed in a valve body 136. When the spool 124 is placed in its "B" state (SUPPLY position), the spool land 134B is positioned so that the input port communicating with the conduit 72 is fully open to the cylinder bore 138. On the other hand, when the spool 124 is in its "A" state (DISCHARGE position), the spool land 134A is positioned so that the port communicating with the discharge conduit 130 is fully open to the cylinder bore 138. A restrictor 140 is provided on the conduit 72 to limit the maximum flow of the pressurized fluid into the spool valve 118.

Like the solenoid valve 28, the solenoid valve 30 is provided with a solenoid 31, and an orifice 142 is disposed in a passage communicating with the conduit 72. The spool valve 120 includes a spool 144 having a pressure receiving end face, and a spring 146 biasing the spool 144 at its end opposite to the pressure receiving end face. When the solenoid valve 30 is in the closed position, i.e., when the solenoid 31 is OFF, the line pressure exerted through the orifice 142 as a pilot pressure is applied so as to act on the pressure receiving end face of the spool 144, whereby the spool 144 is moved against a biasing force of the spring 146 and placed in its "B" state. This state of the spool 144 (spool 120) is indicated in FIG. 3 on the right side of the centerline CH. When the solenoid valve 30 is in the open position with the solenoid 31 in the ON position, the pilot pressure (line pressure through the orifice 132) is released and the spool 144 is moved with a biasing force of the spring 146 and placed in its "A" state. This state of the spool 144 (spool valve 120) is indicated on the left side of the centerline CH.

The spool valve 120 has an downstream supply port 148 and an upstream discharge port 150 both connected to the hydraulic cylinder 44, and further has an upstream supply port 152 and a downstream discharge port 154 connected to the supply and discharge conduits 128 and 130, respectively. When the solenoid 31 is in the OFF position and the spool 144 is placed in its "B" state (DISCHARGE position on the side of the spring 146), the downstream and upstream supply ports 148, 152 are disconnected and the upstream and downstream discharge ports 150, 154 are connected. When the solenoid 31 is in the ON position and the spool 144 is placed in its "A" state (SUPPLY position), the upstream and downstream discharge ports 150, 154 are disconnected while the downstream and upstream supply ports 148, 152 are connected.

The spool 144 is formed with a restrictor passage 152 which maintains limited communication between the downstream and upstream supply ports 148, 152 even while the spool 144 is held in its "B" state. The restricted fluid flow through this restrictor passage 156 is selected to be not less than a leakage flow from the first hydraulic cylinder 44.

The spool 144 consists of a shaft portion 158, and four spool lands 160A, 160B, 160C and 160D which are larger in diameter than the shaft portion 158 and spaced from each other along the axis of the shaft portion 158. The thus constructed spool 144 is slidably received in a cylinder bore 163 formed in the valve body 136. When the spool 144 is switched from its "A" state to its "B" state, the spool land 160B is moved past the upstream discharge port 150, whereby the port 150 is opened. When the spool 144 is restored to its "A" state, the spool land 160A is moved past the downstream supply port 148, whereby the port 148 is opened. Although the upstream and downstream discharge ports 150, 154 are disconnected when the spool 144 is in the "A" state as previously indicated, a small amount of fluid is discharged from the first hydraulic cylinder 44 as a leakage flow through a clearance 159 (FIG. 2) which is formed between the axially movable rotor 46 and the input shaft 32. Therefore, the solenoid valve 120 of the shift-speed control valve unit 60 is not provided with a restrictor passage for restricting the discharge flow of the fluid from the cylinder 44. Accordingly, the solenoid valve 120 is not provided with a restrictor port communicating with such a restrictor passage. In other words, an otherwise required spool land for opening and closing such a restrictor port is eliminated, and thus the overall length and weight of the spool 144 are significantly reduced.

A restrictor 162 provided on an upstream discharge conduit 161 between the cylinder 44 and the upstream discharge port 150 is to limit the maximum discharge flow of the fluid from the cylinder 44.

The closed (OFF) and open (ON) positions of the solenoid valves 28, 30 are shown in FIG. 3 on the right and left sides of the indicated centerline, corresponding to the "B" and "A" states of the spools 124, 144 indicated on the right and left sides of the centerline CS, CH, respectively.

For greater clarification, reference is now made to Table 1 below to explain the operating states of the speed-ratio control valve assembly which consists of the valve units 58 and 60 which have been described hitherto. The hydraulic control by these valve units 58, 60 is effected in substantially the same manner as disclosed in copending U.S. Patent Application (Ser. No. 665,367) filed on Oct. 26, 1984 in the name of the assignee of the present application, claiming the priority benefit of original Japanese Patent Application No. 58-203130.

TABLE 1

| Solenoids | | State of | State of | Shifting of Trans- |
|---|---|---|---|---|
| 29 | 31 | Spool Valve 58 | Spool Valve 60 | mission |
| OFF | ON | "B" | "A" | Rapid Shift-up |
| OFF | ON/OFF | "B" | Alternate "A" and "B" | Normal Shift-up |
| OFF | OFF | "B" | "B" | Slow Shift-up |
| ON | ON | "A" | "A" | Slow Shift-down |
| ON | ON/OFF | "A" | Alternate "A" and "B" | Normal Shift-down |
| ON | OFF | "A" | "B" | Rapid Shift-down |

Figure 7:
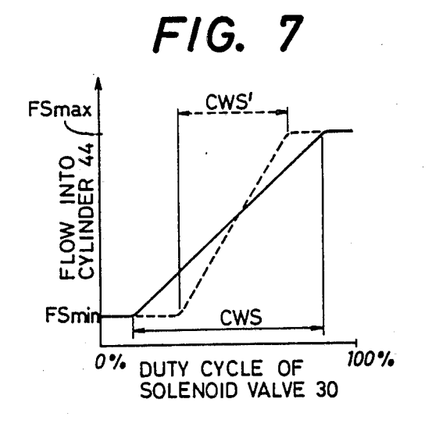
FIGS. 7 and 8 are graphical representations showing changes in the amounts of fluid flow through a shift-speed control valve unit shown in FIG. 3 to and from a hydraulic cylinder, in relation to a duty cycle of signals applied to actuate a solenoid of the control valve unit.

When the speed ratio of the transmission 10 is decreased, that is, when the tramsmission 10 is shifted up, the speed-ratio controller 14 generates the DRIVE signal SD1 which deenergizes the solenoid 29 of the solenoid valve 28, whereby the spool 124 of the shift-direction switching valve unit 58 is placed in its "B" state. In the meantime, the speed-ratio controller generates the drive signal SD2 which energizes the solenoid 31 of the solenoid valve 30, whereby the spool 144 of the shift-speed control valve unit 60 is placed in its "A" state. In this condition, the pressurized fluid is fed into the first hydraulic cylinder 44 through the conduit 72, restrictor 140, supply conduit 128, upstream supply port 152, and downstream supply port 148, at a maximum flow rate of FSmax as indicated in the graph of FIG. 7. As a result, the effective diameter of the first variable-diameter pulley 24 is rapidly increased while the effective diameter of the second variable-diameter pulley 26 is rapidly decreased. In this manner, the speed ratio of the transmission 10 (speed of the input shaft 32 over speed of the output shaft 34) is rapidly decreased. The "ON" state of the solenoid 31 is interpreted to mean the 100% duty cycle of the solenoid valve 30.

When the transmission 10 is slowly shifted up, that is, when the speed ratio of the transmission 10 is slowly decreased, the speed-ratio controller 14 generates the DRIVE signal SD2 which deenergizes the solenoid 31, and thus the spool 144 of the shift-speed control valve unit 60 is placed in its "B" state. As a result, the pressurized fluid from the conduit 72 is fed to the first hydraulic cylinder 44 through the restrictor passage 156 formed in the spool 144. Consequently, the fluid flow into the cylinder 44 is held low at the minimum level of FSmin as indicated in FIG. 7. Accordingly, the shifting-up rate (rate of decrease in the speed ratio) of the transmission 10 is greatly reduced. The "OFF" state of the solenoid 31 is interpreted to mean the 0% duty cycle of the solenoid valve 30.

When the transmission 10 is shifted up at a normal rate intermediate between the maximum and minimum rates FSmax and FSmin, pulses of the DRIVE signals SD2 are generated from the speed-ratio controller 14 to operate the solenoid valve 30 at a suitable duty cycle, i.e., to turn ON and OFF the solenoid 31, whereby the spool 144 is alternately placed in its "A" and "B" states (the spool valve 120 is operated at a duty cycle corresponding to the duty cycle of the solenoid valve 30). In this way, the fluid flow into the cylinder 44 is varied continuously as shown in solid line in FIG. 7, by changing the duty cycle of the solenoid valve 30.

Figure 8:
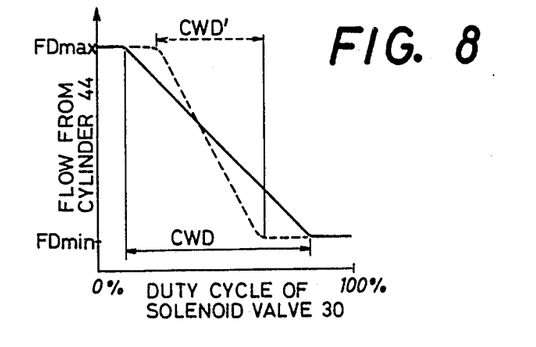

When the speed ratio of the transmission 10 is increased, that is, when the transmission 10 is shifted down, the DRIVE signal SD1 from the speed-ratio controller 14 energizes the solenoid 29 of the solenoid valve 28, and the spool 124 of the shift-direction switching valve unit 58 is placed in its "A" state. In the meantime, the DRIVE signal SD2 from the controller 14 deenergizes the solenoid 31 of the solenoid valve 30, whereby the spool 144 of the shift-speed control valve unit 60 is placed in its "B" state. In this condition, the pressurized fluid is discharged from the first hydraulic cylinder 44 through the restrictor 162, upstream discharge port 150, downstream discharge port 154, discharge conduit 130 and drain conduit 131, at the maximum flow rate of FDmax as shown in the graph of FIG. 8. Consequently, the effective diameter of the first variable-diameter pulley 24 is rapidly decreased while that of the second pully 26 is rapidly increased. In this manner, the speed ratio of the transmission 10 (speed of the input shaft 32 over speed of the output shaft 34) is rapidly increased.

When the transmission 10 is slowly shifted down, that is, when the speed ratio of the transmission 10 is slowly increased, the speed-ratio controller 14 generates the DRIVE signal SD2 which energizes the solenoid 31, and thus the spool 144 of the shift-speed control valve unit 60 is placed in its "A" state. As a result, the upstream and downstream discharge ports 150 and 154 are disconnected by the spool land 160B. As previously mentioned, however, the fluid leaks from the cylinder 44 through the clearance 159 between the movable rotor 46 and the input shaft 32, at the minimum flow rate of FDmin as shown in FIG. 8. Accordingly, the effective diameter of the first variable-diameter pulley 24 is slowly reduced, and the transmission 10 is slowly shifted down.

When the transmission 10 is shifted down at a normal rate intermediate between the maximum and minimum rates FDmax and FDmin, pulses of the DRIVE signals SD2 are generated from the speed-ratio controller 14 to operate the solenoid valve 30 at a suitable duty cycle, i.e., to turn ON and OFF the solenoid 31, whereby the spool 144 is alternately placed in its "A" and "B" states (the spool valve 120 is operated at a duty cycle corresponding to the duty cycle of the solenoid valve 30). In this way, the fluid flow from the cylinder 44 is varied continuously as shown in solid line in FIG. 8, by changing the duty cycle of the solenoid valve 30.

As described above, the rates of supply and discharge of the fluid to and from the first hydraulic cylinder 44 are continuously varied, and the transmission 10 is shifted up and down in order to control a selected variable, e.g., an actual engine speed, to coincide with a predetermined target engine speed.

In this connection, it is important to note that the shift-speed control valve unit 60 incorporates no restrictor passage and port for restricting the discharge flow from the cylinder 44. The absence of such restrictor means eliminates the need of providing the spool 144 with an additional land for selectively connecting such a restrictor port with the upstream or downstream discharge port 150, 154. Therefore, the overall length of the spool 144 and consequently its weight are accordingly reduced. Thus, the shift-speed control valve unit 60 is given an improved response to ON/OFF switching actions of the solenoid valve 30 during its duty cycling, and the duty cycle range CWS, CWD in relation to the flow rate is considerably enlarged as compared with the duty cycle range CWS', CWD' of a control valve unit known in the art, as depicted in FIGS. 7 and 8. This means enhanced control accuracy of the valve unit 60 of the instant apparatus.

Further, the reduced length and weight of the spool 144 result in reduction in size of the valve unit 60, which provides an advantage of decreased cost of manufacture of the valve unit 60.

It is appreciated that some or all of the valves and valve units 64, 66, 58, 60, etc. (FIG. 3) be incorporated in a single housing.

It is possible to reverse the locations of the two valve units 58, 60, that is, to dispose the valve units such that the shift-direction switching valve unit 58 is located on the side of the cylinder 44.

Figure 9:
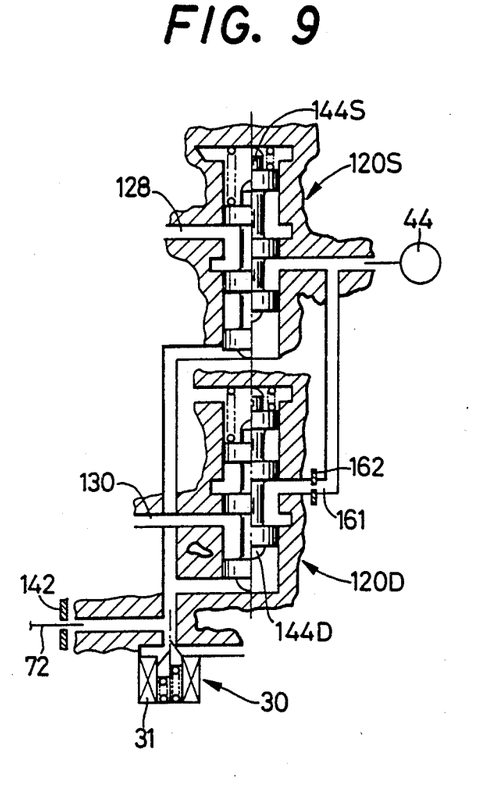
FIG. 9 is a fragmentary cross sectional view showing another embodiment of the invention.

A modified form of the spool valve 120 of the shift-speed control valve assembly 60 is illustrated in FIG. 9, wherein the spool valve 120 consists of a first spool valve 120S and a second spool valve 120D which control the supply and discharge flows of the fluid to and from the cylinder 44, respectively. In this embodiment, spools 144S and 144D of the spool valves 120S and 120D are further reduced in length and weight, and consequently their operating response is further improved. While both of the spools 144S and 144D are operated by a single solenoid valve 30, it is possible to use two solenoid valves for the respective spools.

The above spool valves 120S and 120D may be interposed between the junction of the supply conduit 128 and the discharge conduit 130, and the cylinder 44.

Figure 10:
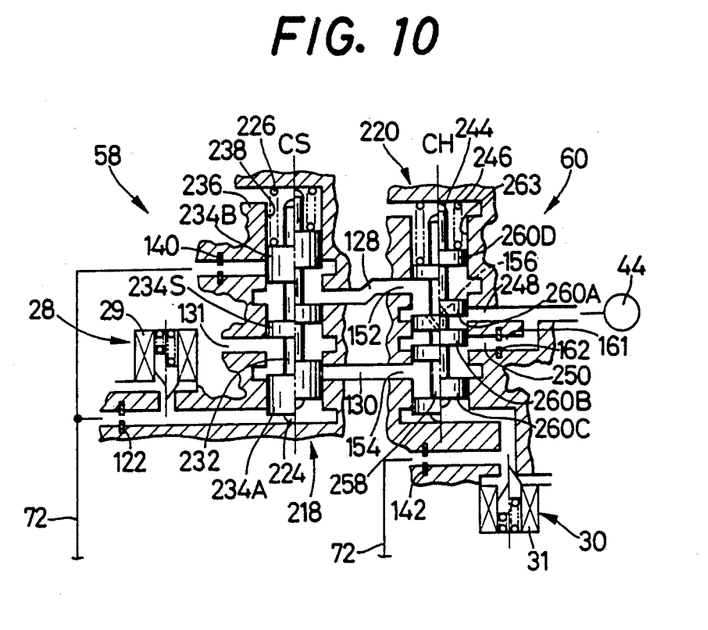
FIGS. 10 and 11 are fragmentary cross sectional views of further embodiments of the invention.
Figure 11:
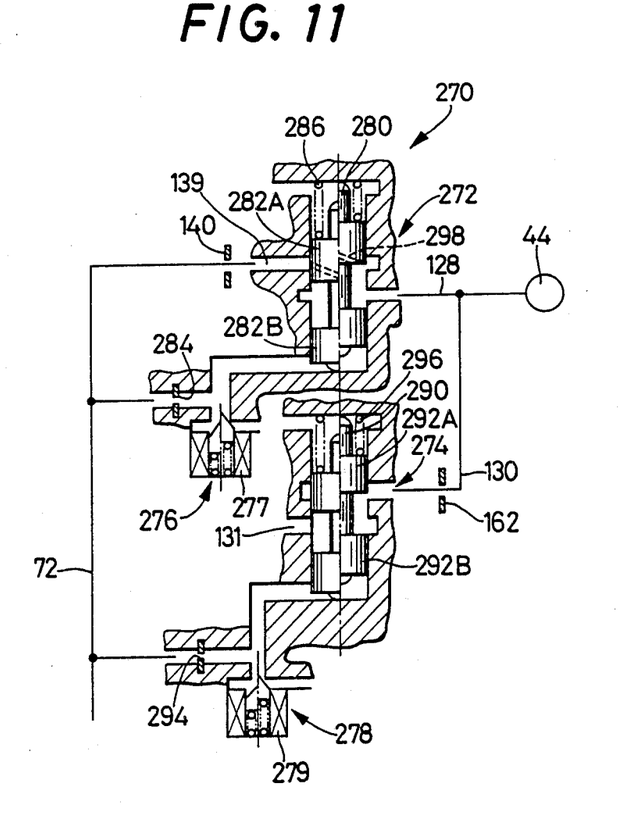

Referring to FIGS. 10-11, other embodiments of the invention will now be described. In these figures, components similar to those used in FIG. 3 will be identified by the same reference numerals, and their repeated description is omitted.

There are shown in FIG. 10 spool valves 218 and 220 which are similar to the spool valves 118 and 120 of the first embodiment of FIG. 3, with the exception that their spools 224 and 244 are shorter than the spools 124 and 144 of the spool valves 118, 120.

Described in more detail, the spool 224 consists of a shaft portion 232, and three spool lands 234A, 234B and 234S which are larger in diameter than the shaft portion 232 and spaced from each other along the length of the shaft portion 232. The thus constructed spool 124 is slidably received in a cylinder bore 238 formed in a valve body 236. When the spool 224 is placed in its "B" state (SUPPLY position), the spool land 234B is positioned so that the input port communicating with the supply conduit 72 is partially open to the cylinder bore 238. On the other hand, when the spool 224 is in its "A" state (DISCHARGE position), the spool land 234A is positioned so that the port communicating with the discharge conduit 130 is partially open to the cylinder bore 238. A restrictor 140 is provided on the conduit 72 to limit the maximum flow of the pressurized fluid into the spool valve 118. In other words, the spool 224 is so adapted that its lands 234B and 234A only partially open the ports communicating with the conduits 72 and 130. That is, the spool 224 has a shorter operating stroke than the spool 124 of the previous embodiment. Hence, the spool 224 provides an improved operating response to the ON/OFF switching actions of the solenoid 29.

Similarly, the spool 244 of the solenoid valve 220 consists of a shaft portion 258, and four spool lands 260A, 260B, 260C and 260D which are larger in diameter than the shaft portion 258 and spaced from each other along the axis of the shaft portion 258. The thus constructed spool 244 is slidably received in a cylinder bore 263 formed in the valve body 236. When the spool 244 is switched from its "A" state to its "B" state, the spool land 260B is moved partially past the upstream discharge port 250, whereby the port 250 is partially opened to the cylinder bore 263 (about 50%). When the spool 244 is restored to its "A" state, the spool land 260A is moved partially past the downstream supply port 248, whereby the port 248 is partially opened to the cylinder bore 263. Stated differently, the operating stroke of the spool 244 is selected so that the ports 250 and 248 are partially opened by the spool lands 260B and 260A, respectively. This means reduced length and weight of the spool 244, and improved operating response of the spool valve 220.

Although the ports of the spool valve 218 communicating with the conduits 72 and 130, and the ports 248 and 250 of the spool valve 220 are only partially opened, there arises no operating troubles due to such partial opening of the ports, because a sufficient area of communication is provided by an annular groove of large width and diameter which communicates with each of those partially open ports, and which keeps the flow resistance at a relatively low level.

As stated above, the solenoid valve 220 is so adapted that a relatively short operating stroke of the spool 244 permits the establishment of the previously indicated "B" state in which the upstream supply port 250 is partially opened, and the "A" state in which the downstream supply port 248 is partially opened. Thus, the shift-speed control valve unit 60 is given an improved response to ON/OFF switching actions of the solenoid valve 30 during its duty cycling, and the duty cycle range CWS, CWD in relation to the flow rate is considerably enlarged as compared with the duty cycle range CWS', CWD' of a control valve unit known in the art, as depicted in FIGS. 7 and 8. This means enhanced control accuracy of the valve units 58, 60 of the instant apparatus.

Further, the reduced length and weight of the spools 224 and 244 of the instant embodiment result in reduction in size of the valve units 58, 60, which provides an advantage of decreased cost of manufacture as well as the above-indicated improvement in the operating response. Furthermore, the reduced operating stroke of the spools 224, 244 enlarges the tolerance of a spring constant of the biasing springs 226, 246.

A further embodiment of the invention is illustrated in FIG. 11, wherein a shift-direction switching valve unit 270 comprises a pair of spool valves 272, 274, and solenoid valves 276, 278. The spool valve 272 is a switching valve for selectively connecting and disconnecting the supply conduits 72 and 128. A spool 280 of the spool valve 272 is movable by the pilot solenoid valve 272 between its two positions ("A" and "B" states) as previously described. The spool 280 has two spool lands 282A and 282B. When a solenoid 277 of the solenoid valve 276 is energized and the valve 276 is open, the pilot pressure (line pressure) through an orifice 284 is released and the spool 280 is moved with a biasing force of a spring 286 in a direction away from the spring 286, whereby the input port 139 communicating with the conduit 72 is closed by the spool land 282A. When the solenoid 277 is deenergized, the solenoid valve 276 is closed and the pilot pressure is applied to the pressure receiving end face of the spool 280, whereby the spool 280 is moved toward the spring 286 against its biasing force. As a result, the spool land 282A opens the input port 139 to provide communication between the supply conduits 72 and 128. In this connection, it is noted that the operating stroke of the spool 280 is determined so that the input port 139 is partially open. That is, the spool 280 (spool valve 272) has a relatively short stroke for improved response.

The spool valve 274 is a switching valve for selectively connecting and disconnecting the discharge conduit 130 and the drain conduit 131. Like the spool 280 of the spool valve 272, a spool 290 of the spool valve 274 is provided with spool lands 292A and 292B, and operated between its two positions with the pilot pressure through an orifice 294 and the biasing force of a spring 296, in response to the operating states of a solenoid 279 of the solenoid valve 278. Thus, the input communicating with the drain conduit 132 is opened and closed by the spool land 292A. It is also noted that the operating stroke of the spool 290 is so selected that the input port communicating with the drain conduit 131 is partially open when the discharge and drain conduits 130 and 131 are held in communication with each other. This means a relatively short operating stroke and consequently improved response of the spool 290 (spool valve 272).

In the above-described arrangement of the shift-direction switching valve unit 270, the transmission 10 is rapidly shifted up when the solenoid 277 is deenergized and the spool 280 is moved toward the spring 286 against its biasing force. When the solenoid 277 is energized and the spool 280 is moved in a direction away from the spring 286 with its biasing force, the transmission 10 is slowly shifted up. When the solenoid valve 276 is energized and deenergized (turned ON and OFF)

alternately at a controlled duty cycle as previously discussed, the shifting-up operation of the transmission 10 is effected at a normal rate intermediate between the rapid and slow rates. When the solenoid 279 is deenergized and the spool 290 is moved against the biasing force of the spring 296, the transmission 10 is rapidly shifted down. The transmission 10 is slowly shifted down when the spool 290 is moved with the biasing force upon energization of the solenoid 279. An intermediate shift-down rate is obtained when the solenoid valve 278 is operated according to a controlled duty cycle.

The spool 280 has a restrictor passage 298 which serves to restrict the fluid flow into the cylinder 44, so that the shifting-up motion of the transmission 10 is achieved slowly (at a low rate). While the energization (ON) and deenergization (OFF) states of the solenoids 277, 279 in relation to the moving directions of the spools 280, 290 may be changed as desired, it is preferred, from the standpoint of fail-safe operation, to adopt the relations of the present embodiment, wherein the supply and discharge of the fluid to and from the cylinder 44 are both inhibited when the solenoids 277 and 279 are both energized.

In the above embodiment, the shift-direction switching valve unit 270 is capable of functioning to control the fluid flow, and therefore eliminates a shift-speed control valve unit (60) as used in the previous embodiments. Further, since the valve unit 270 uses the two spool valves 272 and 274, the length and weight of their spools 280 and 290 are reduced and the operating response is accordingly improved. Hence, like the shift-speed control valve unit 60, the valve unit 270 of the instant embodiment is capable of controlling the fluid flow over a relatively wide range as a function of the duty cycle of the control solenoids 277, 279, whereby the rate of change of the speed ratio of the transmission 10 can be varied smoothly.

While the present invention has been described in its preferred embodiments, it is to be understood that the invention is not limited thereto and that various changes and modifications may occur to those skilled in the art without departing from the spirit and scope of the invention.

What is claimed is:

1. A hydraulic control system for controlling a speed ratio of a hydraulically-operated continuously variable transmission of belt-and-pulley type having a variable-diameter pulley and a hydraulic cylinder for changing an effective diameter of the variable diameter-pulley of the transmission, said hydraulic control system including a speed-ratio control valve assembly for controlling the supply and discharge of a pressurized fluid to and from the hydraulic cylinder to thereby change the speed ratio of the transmission, said speed-ratio control valve assembly comprising:

a shift-direction switching valve unit disposed in fluid supply and discharge conduits communicating with said hydraulic cylinder, for controlling a direction in which said speed ratio of the transmission is varied;

a shift-speed control valve unit of spool-valve type connected to said shift-direction switching valve unit, the shift-speed control valve unit being selectively placed in a first state in which the fluid supply and discharge flows to and from the hydraulic cylinder through said conduits are permitted, or in a second state in which said fluid supply flow is restricted while said fluid discharge flow is inhibited;

actuator means for placing said shift-speed control valve unit alternately in said first and second states to control a rate of variation in said speed ratio of the transmission in the direction established by said shift-direction switching valve unit; and said shift-speed control valve unit having only two discharge ports as ports associated with the fluid discharge from said hydraulic cylinder, said two discharge ports consisting of an upstream discharge port communicating with said hydraulic cylinder, and a downstream discharge port communicating with a drain conduit, said upstream and downstream discharge ports being connected to each other when the shift-speed control vavle unit is placed in said first state, but disconnected from each other when the valve unit is placed in said second state.

2. The hydraulic control system of claim 1, wherein said shift-speed control valve unit comprises a single spool axially movable between a first and a second position corresponding to said first and second states to permit and inhibit said fluid discharge flow from said hydraulic cylinder, and said actuator means comprises a pilot solenoid valve to activate said spool by means of selective application of the fluid pressure to the spool, said solenoid valve having alternately turned on and off at a controlled duty cycle to control said rate of variation in said speed ratio.

3. The hydraulic control system of claim 1, wherein said shift-speed control valve unit comprises a first spool axially movable between two positions for permitting and inhibiting the discharge flow of the fluid through said fluid discharge conduit, respectively, and a second spool axially movable between two positions for permitting and restricting the supply flow of the fluid through said fluid supply conduit, respectively, said actuator means comprising a single pilot solenoid valve to activate said first and second spools by means of selective application of the fluid pressure to the spools.

4. A hydraulic control system for controlling a speed ratio of a hydraulically-operated continuously variable transmission of belt-and-pulley type having a variable-diameter pulley and a hydraulic cylinder for changing an effective diameter of the pulley, said hydraulic control system including a speed-ratio control valve assembly for controlling the supply and discharge of a pressurized fluid to and from the hydraulic cylinder to thereby change the speed ratio of the transmission, said speed-ratio control valve assembly comprising:

a shift-direction switching valve unit disposed in fluid supply and discharge conduits communicating with said hydraulic cylinder and a hydraulic pressure source, for controlling a direction in which said speed ratio of the transmission is varied;

a shift-speed control valve unit of spool-valve type connected to said shift-direction switching valve unit, said shift-speed control valve unit comprising (a) a valve body having a cylinder bore and plural ports communicating with said fluid supply and discharge conduits and open to said cylinder bore, (b) a spool having a shaft portion, and a plurality of spool lands larger in diameter than said shaft portion and spaced from each other axially of the shaft portion, said spool being slidably received in said cylinder bore, and (c) a spool actuator to activate the spool by means of selective application of the fluid pressure to an end face of the spool, to thereby axially move the spool between a first position in which the supply and discharge flows of the fluid to and from said hydraulic cylinder through said conduits are permitted, and a second position in which said supply flow is restricted while said discharge flow is inhibited, said spool lands opening and closing said ports when said spool is moved between said first and second positions, whereby said shift-speed control valve unit is placed selectively in first and second states corresponding to said first and second positions, said spool actuator being operable to place said spool alternately in said first and second positions to control a rate of variation in said speed ratio of the transmission in the direction established by said shift-direction switching valve unit, said spool lands of the spool only partially opening the corresponding port to permit the flow of the fluid therethrough at least when the spool is placed in one of said first and second positions.

5. The hydraulic control system of claim 4, wherein said spool actuator comprises a pilot solenoid valve to selectively apply the fluid pressure to said end face of the spool to move the spool to one of said first and second positions, said solenoid valve being alternately turned on and off at a controlled duty cycle to control said rate of variation in said speed ratio.

6. The hydraulic control system of claim 4, wherein said plural ports comprise only two discharge ports as ports associated with the fluid discharge from said hydraulic cylinder, said two discharge ports consisting of an upstream discharge port communicating with an upstream discharge conduit connected to said hydraulic cylinder, and a downstream discharge port communicating with a downstream discharge conduit connected to said hydraulic pressure source, said upstream and downstream discharge ports being connected to each other when the shift-speed control valve unit is placed in said first state, but disconnected from each other when the valve unit is placed in said second state.

7. The hydraulic control system of claim 6, wherein said spool actuator comprises a pilot solenoid valve to selectively apply the fluid pressure to said end face of the spool to move the spool to one of said first and second positions, said solenoid valve being alternately turned on and off at a controlled duty cycle to control said rate of variation in said speed ratio.

8. A hydraulic control system for controlling a speed ratio of a hydraulically-operated continuously variable transmission of belt-and-pulley type having a variable-diameter pulley and a hydraulic cylinder for changing an effective diameter of the pulley, said hydraulic control system including a speed-ratio control valve assembly for controlling the supply of a pressurized fluid from a hydraulic pressure source to the hydraulic cylinder, and the discharge of the fluid from the hydraulic cylinder, to thereby change the speed ratio of the transmission, said speed-ratio control valve assembly comprising:

a shift-direction switching valve unit comprising (a) a valve body having a cylinder bore and plural ports open to said cylinder bore, (b) a spool having a shaft portion, and a plurality of spool lands larger in diameter than said shaft portion and spaced from each other axially of the shaft portion, said spool being slidably received in said cylinder bore, and (c) a spool actuator to activate the spool by means of selective application of the fluid pressure to an end face of the spool, to thereby axially move the spool between a first position in which the supply flow of the fluid from the pressure source to the hydraulic cylinder is permitted, and a second position in which said supply flow of the fluid is inhibited while the discharge flow from the hydraulic cylinder is permitted, said spool lands opening and closing said ports when said spool is moved between said first and second positions, whereby said shift-direction switching valve unit is placed selectively in first and second states corresponding to said first and second positions, to control a direction of flow of the fluid and thereby control a direction in which said speed ratio of the transmission is varied;

said spool lands of the spool only partially opening the corresponding port to permit the flow of the fluid therethrough at least when the spool is placed in one of said first and second positions;

a shift-speed control valve unit disposed in fluid supply and discharge conduits and associated with said shift-direction switching valve unit and with said hydraulic cylinder, the shift-speed control valve unit being selectively placed in a first state in which the fluid supply and discharge flows to and from said hydraulic cylinder, or in a second state in which said fluid supply flow is restricted while said fluid discharge flow is inhibited, to control a rate of variation in said speed ratio of the transmission; and said spool lands of the spool of said shift-speed control valve unit only partially opening the corresponding port to permit the flow of the fluid therethrough at least when the spool is placed in one of said first and second positions thereof.

9. The hydraulic control system of claim 8, wherein said spool actuator of said shift-direction switching valve unit comprises a pilot solenoid valve to selectively apply the fluid pressure to said end face of the spool to move the spool to one of said first and second positions.

10. The hydraulic control system of claim 8, wherein said speed-ratio control valve assembly further comprises a shift-speed control valve unit disposed in fluid supply and discharge conduit and associated with said shift-direction switching valve unit and with said hydraulic cylinder, the shift-speed control valve unit being selectively placed in a first state in which the fluid supply and discharge flows to and from the hydraulic cylinder through said conduits are permitted, or in a second state in which said fluid supply flow is restricted while said fluid discharge flow is inhibited, to control a rate of variation in said speed ratio of the transmission in the direction established by said shift-direction switching valve unit, said shift-speed control valve unit having only two discharge ports as ports associated with the fluid discharge from the hydraulic cylinder, said two discharge ports consisting of an upstream discharge port communicating with an upstream discharge conduit connected to the hydraulic cylinder, and a downstream discharge port communicating with a downstream discharge conduit connected to the pressure source, said upstream and downstream discharge ports being connected to each other when the shift-speed control valve unit is placed in said first state, but disconnected from each other when the valve unit is placed in said second state.

11. A hydraulic control system for controlling a speed ratio of a hydraulically-operated continuously variable transmission of belt-and-pulley type having a variable-diameter pulley and a hydraulic cylinder for changing an effective diameter of the pulley, said hydraulic control system comprising a speed-ratio control valve assembly for controlling the supply of a pressurized fluid from a hydraulic pressure source to the hydraulic cylinder, and the discharge of the fluid from the hydraulic cylinder, to thereby change the speed ratio of the transmission, wherein the improvement comprises:

said speed-ratio control valve assembly including (a) a valve body having a first and a second cylinder bore, a pair of supply ports open to said first cylinder bore to supply the fluid from the pressure source to said hydraulic cylinder, a pair of discharge ports open to said second cylinder bore to discharge the fluid from said hydraulic cylinder, (b) a first and a second spool slidably received in said first and second cylinder bores, respectively, each of the first and second spools having a shaft portion, and a plurality of spool lands larger in diameter than said shaft portion and spaced from each other axially of the shaft portion, and (c) a first and a second spool actuator to activate said first and second spools, respectively, by means of selective application of the fluid pressure to an end face of the respective spools, to thereby axially move each of said first and second spools between a first position and a second position, the supply flow of the fluid from the pressure source to the hydraulic cylinder is permitted when said first spool is placed in its first position, and inhibited when the first spool is placed in its second position, the discharge flow of the fluid from the hydraulic cylinder is permitted when said second spool is placed in its first position, and inhibited when the second spool is placed in its second position, said spool lands of the first and second spools only partially opening the corresponding ports to permit the flow of the fluid therethrough at least when the respective first and second spools are placed in one of their first and second positions.

* * * * *